March 29, 1938.   J. HENCHERT   2,112,670
SIDE SEAM FOR CAN BODIES
Filed Sept. 15, 1937
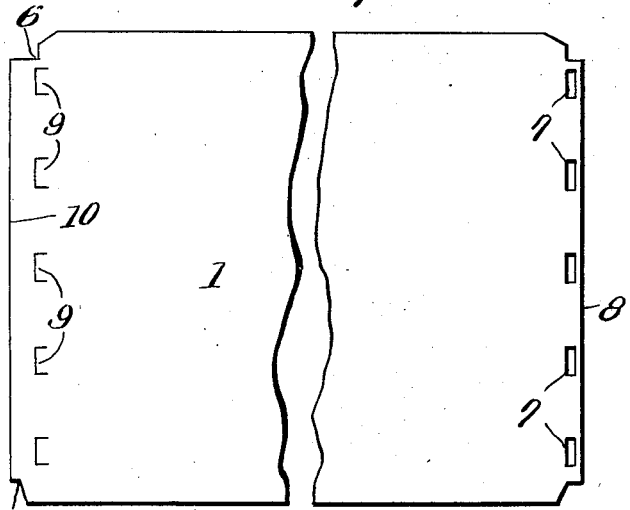
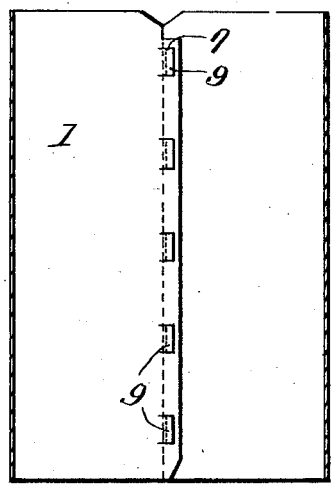
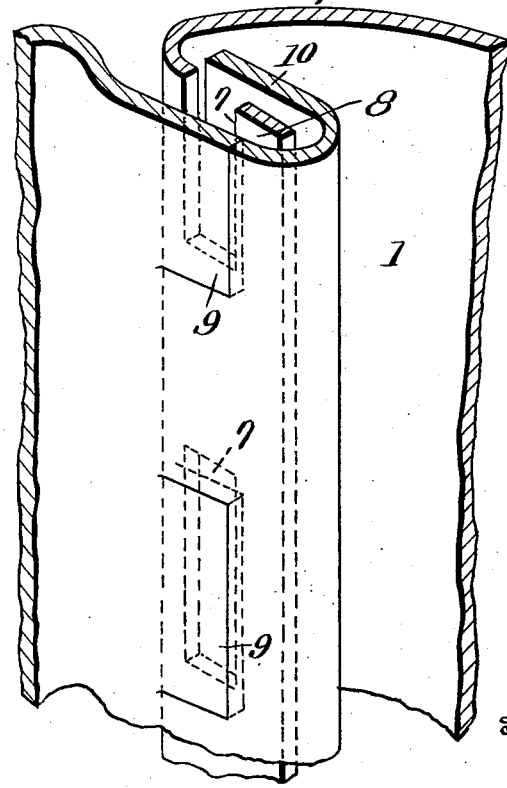
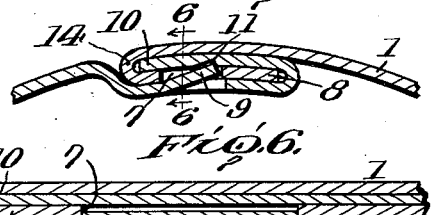
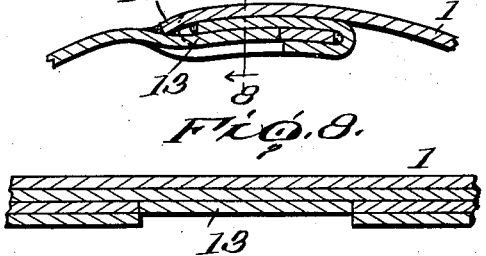
Inventor
John Henchert
By Mason & Porter
Attorneys Patented Mar. 29, 1938

2,112,670

UNITED STATES PATENT OFFICE 2,112,670

SIDE SEAM FOR CAN BODIES

John Henchert, Chicago, Ill., assignor to Continental Can Company, Inc., New York, N. Y., a corporation of New York Application September 15, 1937, Serial No. 164,080

6 Claims. (Cl. 220—76)

The invention relates generally to metal receptacles and has for an object to provide a novel side seam construction for can bodies which will not readily collapse due to handling or shipping, or during the closing or opening of the same, and which is capable of withstanding the high internal pressures to which containers for some products are subjected.

It is well known that containers employing the standard lock side seam, in which the ends of the blank are brought together in the form of outer and inner reversely directed hooks, frequently open or collapse at the seam when pressure is applied at the outside of the container. This crushing strain too readily causes the interlocked hooks to slide apart in the direction of the crushing strain, or to hinge outwardly, even rupturing the solder bond in solder bonded seams of this type. The invention therefore seeks to provide a side seam of the general character stated in which the interlocking hook and body portions are equipped with novel interlocking lug and aperture equipments requiring no more metal than is required in the standard seams referred to but which definitely prevent collapsing or opening up of the seam due to crushing strains from without, or high internal pressures, said equipments being effective in unsoldered as well as in solder bonded seams.

In its more detailed nature, the invention resides in the provision of a can body having a novel side seam and formed from a blank equipped along its outer hook forming edge, and in the inwardly directed hook flange proper, with a row of rectangular lug receiving apertures, and in the body wall adjacent the inner hook forming edge with a row of stamped lugs having free ends directed toward said edge and being adapted for interfitting and locking in said apertures.

With the above and other objects in view that will hereinafter appear, the nature of the invention will be more fully understood by following the detailed description, the appended claims, and the several views of the accompanying drawing.

In the drawing:

Figure 1 is a plan view of a blank from which a can body embodying the invention is formed.

Figure 2 is an upper edge view of the blank after the hooks have been bent at the ends thereof.

Figure 3 is a fragmentary somewhat diagrammatic perspective view showing hook portions of the blank brought together in interengaging relation.

Figure 4 is a central vertical section of a can body looking toward the side seam.

Figure 5 is an enlarged detail horizontal section taken on the line 5—5 on Figure 4 and illustrating a solderless side seam.

Figure 6 is a detail vertical longitudinal section taken on the line 6—6 on Figure 5.

Figure 7 is a view similar to Figure 5 illustrating a soldered side seam.

Figure 8 is a detail vertical longitudinal section taken on the line 8—8 on Figure 7.

In forming a can body embodying my improved side seams, I employ a body blank 5 of generally rectangular form as shown in Figure 1, and this blank may be notched at the corners as at 6 in accordance with the usual practice in the making of lock and lap seams.

Closely adjacent the blank edge which is to form the outer hook I provide a series of equidistantly spaced rectangular apertures 7 extending parallel said edge, so that when the lock flange 8 is bent up, as indicated in Figure 2 of the drawing, the apertures will be disposed in the lock flange adjacent the juncture of said flange and the body metal from which it is bent. See Figure 5.

The blank end which is to form the other or inner hook is equipped with a series of locking or abutment lugs 9 corresponding in size and spacing with the apertures 8 previously described. These lugs are stamped through at three sides, remaining integrally joined at the side toward the main body metal of the blank so as to direct the hinged or free edge lug portions toward the adjacent edge of the blank. The lugs 9 are spaced a greater distance from the edge of the blank than are the apertures 8 so that when the lock flange 10 is bent up, as indicated in Figure 2 of the drawing, said lugs will lie, not in the lock flange proper, but in the blank body wall opposed to the lock flange and with the free ends of the lugs 9 directed toward the hinged portion or bend of the lock flange.

Thus when the blank is shaped into cylindrical form, bringing the lock flanges in interlocking relation, as shown in Figure 3, there will be presented an outer hook having an inwardly directed lock flange 8, and an inner hook having an outwardly directed lock flange 10, said lock flanges 8 and 10 being intended ultimately to interlock in the relation shown in Figure 5.

After the lock flanges have been brought together as diagrammatically indicated in Figure 3, the seam is completed by the usual bumping operation during which the lugs 9 are bent up into the receiving apertures 10 as shown in Figure 5 of the drawing. The free ends of the lugs 9 may be forced into the metal of the lock flange 10, as indicated at 11 in Figure 5, to compensate for "spring back" of said lugs, thus assuring that said free ends will not rise free of the aperture walls and bring about failure of the intended interlocking of parts such as will permit collapsing of the container. Obviously, engagement of the three free edges of each lug 9 against the ends and side wall of each aperture 8 effectively locks the seam against collapsing due to compressive strains, and also greatly strengthens the seam against expansive pressures from within the container. The seam shown in Figures 5 and 6 has been found to be quite an efficient solderless seam. Solder bonding can, of course, be resorted to whenever desired.

In Figures 7 and 8 of the drawing I have illustrated a solder bonded seam. This seam is identical with the one shown in Figures 5 and 6 except that a solder bonding 12 is flowed into the seam, by capillary action, from inside or outside the seam, in the usual manner. In this type of seam the lugs 9 may be forced into the receiving apertures 8 throughout the full length of the lugs as emphasized at 13 in Figure 7, and the metal wall portions defining the apertures in the form of a rounded bend, as indicated at 14 in Figure 5, may be eliminated or displaced as shown in Figure 7 to provide lever or lug portions 15 engaging the can body as shown in Figure 7. The lugs 9 and the portions 15 are solder bonded in the positions shown and greatly strengthen the seam against compressive and expansive strains.

The novel seam herein disclosed is extremely simple in construction and yet presents remarkable advantages by reason of its ability to resist great compressive and expansive strains without rupture. This seam requires no more metal than is necessarily employed in standard forms of lock seams. The specific shape of interlocking lug and aperture equipment herein shown has been found to operate very efficiently, but it is to be understood that the specific shapes of these parts may be altered without departing from the spirit of the invention as expressed in the appended claims.

By eliminating the bend 14 shown in Figure 5, in the manner shown in Figure 7, the seam thickness is reduced from four to three at the positions of the lugs 9. This decreases the lever arm of the circumferential force (present in a container under internal pressure) by an amount equal to one thickness of plate, thereby increasing the strength of the seam.

I claim:

1. A can body side seam comprising an outer hook having an inwardly directed lock flange and an inner hook having a body wall portion and an outwardly directed lock flange interlocked with the lock flange of the outer hook, said inwardly directed lock flange having formed therein a plurality of apertures, and lock lugs stamped up from said body wall portion and interlocking in said apertures.

2. A can body side seam comprising an outer hook having an inwardly directed lock flange and an inner hook having a body wall portion and an outwardly directed lock flange interlocked with the lock flange of the outer hook, said inwardly directed lock flange having formed therein a plurality of apertures, and lock lugs struck up from said body wall to interlock in said apertures, said lock lugs being partially indented in the body of the outwardly directed lock flange and shaped to snugly fit said apertures.

3. A can body side seam comprising an outer hook having an inwardly directed lock flange and an inner hook having a body wall portion and an outwardly directed lock flange interlocked with the lock flange of the outer hook, said inwardly directed lock flange having formed therein a plurality of apertures, and lock lugs stamped up from said body wall portion and interlocking in said apertures, said lock lugs being directed toward the juncture of said body wall portion and said outwardly directed lock flange.

4. A can body side seam comprising an outer hook having an inwardly directed lock flange and an inner hook having a body wall portion and an outwardly directed lock flange interlocked with the lock flange of the outer hook, said inwardly directed lock flange having portions removed therefrom to form a plurality of rectangular apertures therein, and lock lugs the same in number and shape as said apertures stamped through at three sides in said body wall and struck up therefrom to interlock in said apertures with the free portions thereof directed toward the juncture of said body wall and said outwardly directed lock flange and engaging both laterally and longitudinally in said apertures.

5. A can body side seam comprising an outer hook having an inwardly directed lock flange and an inner hook having a body wall portion and an outwardly directed lock flange interlocked with the lock flange of the outer hook, said inwardly directed lock flange having formed therein a plurality of apertures disposed adjacent the juncture of the inwardly directed lock flange with the remainder of the outer hook, and lock lugs stamped in said body wall portion and forced up into interlocking relation in said apertures throughout the whole length of said lugs displacing the juncture portions of the inwardly directed flange defining the inner limits of said apertures to form lever portions overlying and engaging said body wall portion.

6. A can body blank comprising a generally rectangular body formed along one seam forming edge with a plurality of rectangular apertures disposed parallel said edge, and a corresponding number of lock lugs of a shape for snugly fitting said apertures stamped in the body metal inwardly from the other seam forming edge and including free portions directed toward said other edge, said apertures being disposed close to the blank edge thereadjacent so that they will be included in a lock flange formed along said edge, and said lugs being spaced inwardly from the blank edge thereadjacent a greater distance so that they will be close to but excluded from a lock flange formed along that edge.

JOHN HENCHERT.